US006350516B1

(12) United States Patent
Weber et al.

(10) Patent No.: US 6,350,516 B1
(45) Date of Patent: Feb. 26, 2002

(54) PROTECTIVE CORONA COATING COMPOSITIONS AND PROCESSES THEREOF

(75) Inventors: Joseph R. Weber, Rochester; Joan R. Ewing, Fairport, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/431,950

(22) Filed: Nov. 1, 1999

(51) Int. Cl.[7] .................................................. B32B 5/16

(52) U.S. Cl. ....................... 428/332; 428/336; 428/208; 428/195; 428/688; 428/689; 427/419.1; 427/419.2

(58) Field of Search ................................. 428/332, 336, 428/208, 195, 688, 689; 427/419.1, 419.2

(56) References Cited

U.S. PATENT DOCUMENTS 5,839,024 A * 11/1998 May et al. .................... 399/89
5,853,941 A * 12/1998 Rimai et al. ................ 430/122

* cited by examiner

*Primary Examiner*—Leszek Kiliman
(74) *Attorney, Agent, or Firm*—John L. Haack

(57) ABSTRACT

An article including: a corotron assembly and a protective coating thereover, where the coating comprises at least one sequestering additive, such as ferrous fumarate or ferrous oxalate, which additive sequesters acidic oxygenates of nitrogen, such as nitrate or nitrite compounds.

19 Claims, No Drawings

PROTECTIVE CORONA COATING COMPOSITIONS AND PROCESSES THEREOF

BACKGROUND OF THE INVENTION

The present invention relates to printing machines and printing processes. More specifically, the present invention relates to coated corona charging articles, preparative and coating processes thereof, and to imaging processes that include the coated articles. The coated charging articles of the present invention provide for improved image copy quality, greater service lifetimes of corona charging articles, and relatively inexpensive and simple control of acidic oxides of nitrogen compounds formed in corona charging and imaging processes.

Imaging systems including corona charging articles and corona charging methods are known and are illustrated, for example, in U.S. Pat. No. 5,853,941, issued Dec. 29, 1998, to Rimai, et al., the disclosure of which is incorporated herein by reference in its entirety.

In U. S. Pat. No. 5, 839,024, issue Nov. 17, 1998, to May et al., there is disclosed, for example, corona chargers generally and an electrical regulation approach to solving corona induced image defects. A corona charger is disclosed for depositing an electrostatic charge on a charge retentive surface, without the creation of sheeting defects, the charger includes a coronode, and a power supply operating in cycles and providing in each of the cycles electrical power to the coronode to produce a net positive charging current with voltage to the coronode from the power supply operating in a portion of each cycle with a positive polarity to generate positive corona emissions. The power supply operates so that an AC component of the voltage provided by the power supply has a positive polarity in the range of about 60% to about 85% of each cycle. When operating in a broader range of greater than 50% but less than 100%, DC equivalent current to the coronode is controlled below a value causing sheeting.

A common problem associated with corona charging articles is their known propensity to generate compounds of acidic oxides of nitrogen, such as nitric acid, during charging and discharging processes. The acidic oxide compounds can degrade the charge capability of the corona charging article; the compounds can degrade the environmental quality in and around the corona charging article; and the compounds can ultimately degrade the resulting print quality by, for example, oxidizing the photoreceptor, especially its surface, resulting in image defects or blurring or discoloring portions of printed images.

The present invention provides a simple solution to the aforementioned and other problems by providing a corotron electrode with a protective coating thereover, wherein the protective coating contains at least one additive which, for example, scavenges, removes, sequesters, or neutralizes the aforementioned deleterious acidic oxide compounds. The present invention improves print quality, for example, in xerographic printing processes which employ corona charging of an imaging member, compared to an uncoated corotron charger, or alternatively, a coated corotron charger which does not include the protective coating compositions of the present invention. The operational life of charging subsystems can also be extended using the coating compositions and coated corotron charger articles of the present invention.

The disclosure of the above mentioned patent is incorporated herein by reference its entirety. Appropriate components and processes of the patent may be selected for the articles and processes of the present invention in embodiments thereof.

SUMMARY OF THE INVENTION

Embodiments of the present invention, include:

An article comprising:

a corotron assembly with a protective coating thereover, the coating comprising at least one additive which sequesters acidic oxygenates of nitrogen, such as nitrates or nitrites;

A process comprising:

forming a coating mixture comprising a metal oxide or oxides, such as alumina; a sequesterant compound for oxygenates of nitrogen, including for example organic acid salts, such as ferrous fumarate alone or in admixture with a sulfamate salt such as ferrous sulfamate; a conductive additive, such as graphite or carbon black; and optionally a binder;

applying the coating to a corotron assembly; and thereafter using the corotron assembly for charging in imaging processes; and a printing machine that includes a protectively coated negative corona charging article in accordance with the present invention.

These and other aspects are achieved, in embodiments, of the present invention as described and illustrated herein.

DETAILED DESCRIPTION OF THE INVENTION

The present invention provides, in embodiments, an article comprising:

a corotron assembly with a protective coating thereover, the coating comprising at least one additive which, for example, sequesters or neutralizes acidic oxygenates of nitrogen, including nitrates or nitrites, such as nitric acid and nitrous acid.

The corotron assembly can include, for example, a wire electrode, also known as a coronode, a housing, and a screen member. In the present invention the wire electrode is preferably and purposefully left uncoated while the other components of the corotron assembly are preferably coated in accordance with the present invention. The wire electrode can be any suitable conducting material which provides the necessary electron discharge and charging of the photoreceptor, for example, tungsten or its alloys, stainless steel, platinum, rhenium, molybdenum, and the like highly conductive materials.

The protective coating can include one or more additive compounds which are selected primarily for their ability to sequester compounds of acidic oxides of nitrogen, such as nitrates. Acidic nitrate compounds are known to be generated during charging events by the interaction of the electron discharge or plasma of the corona charging wire and atmospheric nitrogen.

The term "sequester" and "sequesteration" is to be construed broadly and includes a host of meanings that embody the concept of nullifying or negating the chemical effects of the aforementioned acidic oxygenates of nitrogen, such as nitrate and nitrite compound(s), and can include, for example, withdrawal, separation, isolation, seizure, segregation, removal, obliteration, transformation, and the like concepts which connote that the acidic oxygenates of nitrogen compound(s) are unavailable for, for example, degradative chemical reaction or reversible adsorption or desorption with the corotron assembly components, the coronode, associated printing machine componentry, or printing marking materials. Thus, the sequesteration of acidic oxygenates of nitrogen by the coating compositions of the present invention protects, for example, the corotron wire and wire surfaces, and surrounding surfaces from the negative and deleterious effects of ambient or otherwise acidic nitrate compounds. Importantly, the "sequesteration" of acidic nitrogen compounds protects the surrounding environment and associated structural, mechanical, and imaging componentry and marking materials, particularly the imaging process and resulting copy quality associated with the coated corotron assembly article. The sequesteration capability provides protection to the electrode and environment surrounding the wire from wire generated acidic oxygenates of nitrogen compounds, ambient acidic nitrate compounds, or derivative compounds formed from the interaction of such compounds with the wire, the coating, or nearby surfaces. The sequestration mitigates or eliminates the negative effects of acidic oxygenates of nitrogen compounds, such as for example, corrosion, oxidation, and the like deterioration, by for example, chemical reduction, neutralization, chelation, physical or chemical absorption, and the like chemical and physical processes.

In embodiments, from about to 2 to about 10 additives can be selected for use in the coating compositions of the present invention.

The coating compositions of the present invention can include one or more binder materials which binder acts as a matrix that holds the coating constituents to the corotron assembly surface and to substantially retain the additive ingredients within in the coating layer.

Binders include any suitable binder resin which preferably can be conveniently coated onto the corotron assembly or individual components, for example, without the use of aggressive solvents, and which binder material does not readily become embrittled or compositionally degrade while in use. Suitable binders include, for example, poly(vinyl acetate), polyesters, polyacrylics, polyacrylates, water soluble or insoluble polyamides, alcohol soluble nylons, and the like materials, and mixtures and or copolymers thereof. Less desirable binders include, for example, polycarbonates and other polymer materials which may require more sophisticated coating methods, involve problematic processing, or solvent handling concerns, and polystyrenes which can oxidatively degrade in-use, and polyvinyl chlorides which can potentially produce corrosive or noxious decomposition products.

The thickness of the fully formulated coating layer or multiple layers on the surface of the wire member, as deposited, dried or cured, can be, for example, from about 0.1 to about 100 microns, and preferably from about 10 to about 100 microns.

The additives compounds can be one or more known compounds that are capable as functioning as reductants of acidic nitrate or nitrite compounds, chelants of acidic nitrate or nitrite compounds, adsorbents of acidic nitrate or nitrite compounds, and mixtures or combinations thereof, including strong stable or ion specific reducing agents and acid absorbing or neutralizing bases. Examples include and listed in approximate order of decreasing efficacy, although not wanting to be limited by theory, are: ferrous fumarate, calcium oxalate, ferrous oxalate, ferrous sulfamate, calcium hydroxide, calcium carbonate, and sulfamate salts of calcium, sodium, and or potassium, and mixtures thereof. In embodiments ferrous fumarate, alone or in admixture with related compounds, is a particularly preferred reducing agent additive compound. Ferrous fumarate is preferred first because of its relatively high stoichiometric reducing capacity compared to other additive compounds and secondly because it produces initial reaction products which are comparable red-ox equivalents of oxalate ions. Sulfamates, and related urea and organo-urea compounds, are a preferred class of co-additives and are believed to function as ion specific reducing agents since they can reduce the first formed reduction product of acid nitrates, that is the nitrites, rather than the acid nitrate itself.

In a preferred embodiment, the additive is ferrous fumarate, or alternatively, a mixture of ferrous fumarate and ferrous sulfamate. The mixture of ferrous fumarate and a sulfamate salt such as ferrous sulfamate may be a preferred combination in view of, for example, the combined reducing capacities, specificities, physical properties, and operational and environmental stabilities. A less desirable sulfamate is, for example, the nickel salt in view of its hygroscopic properties.

When the additive selected is a mixture of ferrous fumarate and ferrous sulfamate, the mixture can be present in the coating in an amount of from about 1 to about 50 weight percent based on the total weight of the coating, and wherein the fumarate and sulfamate salts are present in the mixture in a relative weight ratio of from about 10:1 to about 1:10, and preferably of from about 5:1 to about 1:5.

In preferred embodiments the additive selected for use in the coating can be an additive package that includes, for example, a first additive which chemically reacts with acidic nitrogen compounds or reaction products thereof, and a second additive which physically absorbs acidic nitrogen compounds or reaction products thereof.

In embodiments the coating can comprise:

alumina in an amount of from about 1 to about 98 weight percent based on the total weight of the coating;

an oxalate salt in an amount of from about 1 to about 50 weight percent based on the total weight of the coating;

an conductive additive, such as graphite or an amorphous carbon black in an amount of from about 1 to about 50 weight percent, and preferably from about 10 to about 50 weight percent based on the total weight of the coating; and an optional binder resin in an amount of from about 1 to about 50 weight percent based on the total weight of the coating.

Although not wanting to be limited by theory, the function of the alumina is as high surface area acidic-solid which is relatively acid resistant which can effectively disperse other additives and provide surface area internal to the coating layer on which the ameliorative red-ox and associated chemical reactions can occur. The function of the conductive additive, such as graphite or conductive amorphous carbon black, is to provide conductivity to the coating layer to prevent charge build-up on the wire electrode. The ions of oxalate, ferrous, and sulfamate, alone or in combinations, can function as reductants for acidic nitrogen compounds, for example, to convert ferrous ions into ferric ions. The coating layer can also optionally contain free co-additive compounds such as urea, or alternatively, the co-additives can be integral or covalently bonded to the binder such as urethane and imide containing polymers and copolymers.

The oxidation reactions of the additive compounds, their ions, and the resulting products can be complex and manifold, especially in view of partial and competing reactions. Although not wanting to be limited by theory, principle partial reactions that are believed to be operative can include, for example, 1) Reactions of ferrous fumarate with acidic nitrates:

$$2H^{+}+NO3^{-}+2Fe^{2+}\rightarrow NO2^{-}+2Fe^{3+}+H_2O$$

$$5NO^{3-}+(OOC—CH=CH—COO)^{2-}\rightarrow 5NO^{2-}+(OOC—COO)^{2-}+2CO_{2\uparrow}\uparrow+H_2O$$

$$2H^{+}+NO_3^{-}+(OOC—COO)^{2-}\rightarrow NO_2^{-}+2CO_2\uparrow+H_2O$$

$$2Fe^{3+}+3NO_3^{-}\rightarrow Fe(NO_3)_3 \text{ (a sequestered salt)}$$

2) Reactions of calcium oxalate with acidic nitrates:

$$2H^{+}+NO_3^{-}+(OOC—COO)^{2-}\rightarrow NO_2^{-}+2CO_2 \text{ t } +H_2O$$

$$Ca^{2+}+NO_3^{-}\rightarrow Ca(NO_3)_2 \text{ (a sequestered salt)}$$

$$Ca^{2+}+NO_2^{-}\rightarrow Ca(NO_2)_2 \text{ (a sequestered salt)}$$

3) Reactions of ferrous sulfamate with acidic nitrates:

$$2H^{+}+NO_3^{-}+2Fe^{2+}\rightarrow NO_2^{-}+2Fe^{3+}+H_2O$$

$$NO_2^{-}+NH_2SO_3^{-}\rightarrow N2\uparrow+SO_{4\ 2-}+H_2O$$

4) Fate of acidic nitrite ions (competing reactions)

$$NO_2^{-}+4H^{+}2H_2O+N_{2\uparrow} \text{ (very slow)}$$

$$2HNO_2[+H^{+}]\rightarrow H_2O+N2\uparrow[+H^{+}] \text{ (slow)}$$

$$2NO_2^{-}+O_2[+H+]\rightarrow NO_3^{-}+H_2O\ [+H^{+]}$$

$$HNO_2[+H_2O+H+]\rightarrow NO_x\uparrow[+H_2O\ +H^{+]} \quad \text{(slow)}$$

The resulting ferric ions can function as a basic reactant to chemically neutralize, absorb, precipitate, and the like sequesteration interactions, with the acidic nitrate compounds or ionic species, for example, formation of low or insoluble iron nitrate salts.

The oxalate salt can be selected from a variety of oxalates including calcium, iron(II), and mixtures thereof. In embodiments the coating composition can further include a fumarate salt in an amount of from about 1 to about 50 weight percent based on the total weight of the coating. The function of the fumarate salt is believed to be analogous to the function of the oxalates discussed above.

In embodiments the coating composition can further include a sulfamate salt in an amount of from about 1 to about 50 weight percent based on the total weight of the coating. The function of the sulfamate salt is believed to be analogous to the function of the oxalates discussed above with the additional function of further reducing the nitrite product of the original reaction.

Sulfamate salts such as nickel, ferrous, and the like metal ion species, and mixtures thereof, are known to be reductants for acidic nitrates, and are widely used in the electroplating arts and are readily commercially available. Of the many sulfamates that are commercially available, ferrous sulfamate by itself is a preferred additive. The potassium, sodium, or calcium sulfamate salts are useful in combination with ferrous fumarate or calcium oxalate. Other metal salts, such as the nickel, barium, cobalt, or lead sulfamate salts are contra-indicated in view of their hygroscopicity and toxicity properties. Ferrous fumarate is commercially available, is relatively innocuous, and has been used, for example, as a iron dietary supplement.

In embodiments the coating composition can comprise:

alumina in an amount of from about 1 to about 98 weight percent based on the total weight of the coating;

a conductive additive, such as fine powdered graphite, nanometer sized conductive amorphous carbon black pigment or nanotube compounds, in an amount of from about 1 to about 50 weight percent based on the total weight of the coating; and an imine containing polymer in an amount of from about 1 to about 50 weight percent based on the total weight of the coating.

The imine containing polymer can be for example, a poly(ethyleneimine) polymer or a poly(ethyleneimine) containing copolymer, and preferably possesses a sufficiently high weight average molecular weight, for example, greater than from about 25,000, such as 25,000 to about 100,000, for moderate polydispersities, for example, greater than about 5 to about 10, so that coating composition is not tacky after drying.

Although not wanting to be limited by theory the imine containing polymer is believed to function in the present invention coating composition as, for example, one or more of the following: a nitrate reactant; a nitrate absorbent; and as a binder or co-binder.

The present invention provides, in embodiments, a process comprising:

forming a coating mixture comprising alumina in an amount of from about 1 to about 98 weight percent based on the total weight of the coating; a conductive additive, such as fine powdered graphite, nanometer sized conductive amorphous carbon black pigment or nanotube compound, in an amount of from about 1 to about 50 weight percent based on the total weight of the coating; an oxalate salt in an amount of from about 1 to about 50 weight percent based on the total weight of the coating, and optionally a binder in an amount of from about 1 to about 99 weight percent based on the total weight of the coating; and applying the coating to a corotron assembly and thereafter installing the wire coronode and using the coronode containing coated corotron assembly for charging in imaging processes.

In an embodiment, the oxalate salt used in the above mentioned preparative process can be calcium oxalate that is formed in situ from an approximate stoichiometric mixture of calcium carbonate and oxalic acid. Alternatively, the oxalate salt can ferrous oxalate that is also formed in situ from an approximate stoichiometric mixture of ferrous sulfamate and ammonium oxalate. These and related oxalate salts and equivalent compounds can be generated in situ in accordance with the present invention and as illustrated herein. Alternatively, the salt may be ferrous fumarate obtained commercially as a fine powder.

The optional binder can be, for example, a mixture of poly(ethyleneimine) in amounts of from about 0 to about 95 weight percent based on the total weight of the coating, and poly(vinyl acetate) in amounts of from about 0 to about 95 weight percent based on the total weight of the coating.

The above preparative process can further comprise coating, that is, applying the coating mixture onto a corotron assembly, wherein the thickness of the resulting coating is, for example, from about 0.1 to about 100 microns, and preferably from about 10 to about 100 microns. The present invention provides, in embodiments, a printing machine comprising a negative corona charging article prepared in accordance with the present invention and as disclosed and illustrated herein.

Imaging systems and corona charging processes used therein are known in the art and are illustrated, for example, in the aforementioned U.S. Pat. No. 5,853,941, the disclosure of which is incorporated herein by reference in its entirety.

The invention will further be illustrated in the following nonlimiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

Formulation of Coating Composition

An exemplary procedure for preparing the wire coating compositions follows. An aqueous emulsion coating formulation is prepared by placing into an attritor, or an equivalent device, about 300 grams of stainless steel shot with about 3 to about 5 millimeters average diameter. Equivalent amounts, that is equimolar amounts, of calcium carbonate, oxalic acid, and ferrous sulfamate are added to the attritor. Diluent liquid is added, such as water or other suitable solvent mixtures to lower the final formulation viscosity, and to afford a total solids content of about 10 weight percent or less. The resulting mixture is milled until all solid particulates are either dissolved or reduced to submicron size. Next, nanometer sized carbon black and gamma-alumina are added and milled until well dispersed. A sufficient amount of resin, such as poly(vinyl acetate) latex, is added to contribute about 10 weight percent of the total solids content of the formulation or about 1 weight percent of the total weight of the final coating formulation, then the mixture is milled until homogenous. The steel shot is removed and the mixture is filtered and coated. Alternatively the mixture can be stored and used in the future if vigorous shaking is accomplished just before use.

Example II

Example I can be repeated with the exception that a molar equivalent amount of fumaric acid is substituted for the oxalic acid component.

Example III

Example I can be repeated with the exception that a molar equivalent amount of ferrous fumarate is substituted for the calcium carbonate and oxalic acid components.

Example IV

Example I can be repeated with the exception that, for example, a suitable organic solvent, such as an alcohol, is used in place of water as the diluent liquid.

Example V

Example IV can be repeated with the exception that a suitable alternative polymer resin is selected, such as a polyamide, for example, a nylon, such as NYLON-8□, and is substituted for the poly(vinyl acetate) latex resin components to provide a pigment lacquer coating.

Example VI

Corotron Assembly Coating

The coating compositions of Examples I to V can be applied to corotron assemblies, such as the housing and the screen grid and preferably without the wire coronode electrode present, in appropriate coating thicknesses using known and conventional coating methods to provide coated corotron assemblies which are protected from attack and degradation. The coated assemblies are fitted with an appropriate wire electrode or coronode and thereafter used in imaging processes to enable improved print quality and improved printing device reliability.

Example VII

Electrophotographic Charging and Imaging with the Coated Corona Article

The coated corotron assembly of Example VI can be used in known electrophotographic imaging apparatuses to provide the aforementioned benefits and advantages.

Other modifications of the present invention may occur to one of ordinary skill in the art based upon a review of the present application and these modifications, including equivalents thereof, are intended to be included within the scope of the present invention.

What is claimed is:

1. An article comprising:

a corotron assembly and a protective coating thereover, wherein the coating comprises at least one sequestering additive which sequesters acid nitrates and nitrites.

2. An article in accordance with claim 1, wherein the additive is a mixture of ferrous fumarate and ferrous sulfamate.

3. An article in accordance with claim 1, wherein the additive provides sequesteration that protects the corotron assembly, a coronode electrode wire housed within the assembly, and the environment surrounding the corotron assembly from either or both wire generated acid nitrates and nitrites.

4. An article in accordance with claim 1, wherein from about to 2 to about 10 sequestering additives are selected.

5. An article in accordance with claim 1, wherein the coating further comprises a binder.

6. An article in accordance with claim 1, wherein the sequestering additive comprises: a mixture of a first sequestering additive which chemically reacts with acidic nitrate or nitrite compounds, or reaction products thereof; and a second sequestering additive which physically absorbs acidic nitrate or nitrite compounds, or reaction products thereof.

7. An article in accordance with claim 1, wherein the coating comprises:

alumina in an amount of from about 1 to about 98 weight percent based on the total weight of the coating;

an conductive additive in an amount of from about 1 to about 50 weight percent based on the total weight of the coating, and an oxalate salt in an amount of from about 1 to about 50 weight percent based on the total weight of the coating.

8. An article in accordance with claim 7, wherein the oxalate salt is selected from the group of salts consisting of calcium, iron(II), and mixtures thereof.

9. An article in accordance with claim 7, further comprising a fumarate salt in an amount of from about 1 to about 50 weight percent based on the total weight of the coating.

10. An article in accordance with claim 1, wherein the coating comprises:

alumina in an amount of from about 1 to about 98 weight percent based on the total weight of the coating;

an conductive additive in an amount of from about 1 to about 50 weight percent based on the total weight of the coating; and an imine containing polymer in an amount of from about 1 to about 50 weight percent based on the total weight of the coating.

11. An article in accordance with claim 10, wherein imine containing polymer is poly(ethyleneimine).

12. An article in accordance with claim 10, wherein the imine containing polymer is a reactant of oxygenates of nitrogen, an absorbent of oxygenates of nitrogen, and a binder or co-binder.

13. An article in accordance with claim 10, wherein the thickness of the coating is from about 10 to about 100 microns.

14. A process comprising:

forming a coating mixture comprising: alumina in an amount of from about 1 to about 98 weight percent based on the total weight of the coating; a conductive additive in an amount of from about 1 to about 50 weight percent based on the total weight of the coating; an organic acid salt in an amount of from about 1 to about 50 weight percent based on the total weight of the coating, and optionally a binder in an amount of from about 1 to about 99 weight percent based on the total weight of the coating; and applying the coating to a corotron assembly;

installing a coronode electrode in the coated corotron assembly; and thereafter using the electrode containing coated corotron assembly for charging in imaging processes.

15. A process in accordance with claim 14, wherein the organic acid salt is calcium oxalate formed in situ from an approximate stoichiometric mixture of calcium carbonate and oxalic acid.

16. A process in accordance with claim 14, wherein the organic acid salt is ferrous fumarate formed in situ from an approximate stoichiometric mixture of ferrous sulfamate and ammonium fumarate.

17. A process in accordance with claim 14, wherein the optional binder is a mixture of poly(ethyleneimine) in amounts of from about 0.1 to about 95 weight percent based on the total weight of the coating, and poly(vinyl acetate) in amounts of from about 0.1 to about 95 weight percent based on the total weight of the coating.

18. A process in accordance with claim 14, wherein the thickness of the resulting coating is about 10 to about 100 microns.

19. A printing machine including a negative corona charging article in accordance with claim 1.

* * * * *